United States Patent
Dong et al.

(10) Patent No.: US 9,143,396 B2
(45) Date of Patent: Sep. 22, 2015

(54) VPLS FAST REROUTING METHOD AND DEVICE

(71) Applicant: HUAWEI TECHNOLOGIES CO., LTD., Shenzhen (CN)

(72) Inventors: Jie Dong, Nanjing (CN); Guoyi Chen, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 121 days.

(21) Appl. No.: 14/030,700

(22) Filed: Sep. 18, 2013

(65) Prior Publication Data

US 2014/0022890 A1 Jan. 23, 2014

Related U.S. Application Data

(63) Continuation of application No. PCT/CN2012/072209, filed on Mar. 12, 2012.

(30) Foreign Application Priority Data

Mar. 25, 2011 (CN) .......................... 2011 1 0073459

(51) Int. Cl.
*H04L 1/00* (2006.01)
*H04L 12/24* (2006.01)
*H04L 12/46* (2006.01)
*H04L 12/703* (2013.01)
*H04L 12/413* (2006.01)
*H04L 12/721* (2013.01)

(52) U.S. Cl.
CPC .......... *H04L 41/0654* (2013.01); *H04L 12/413* (2013.01); *H04L 12/4641* (2013.01); *H04L 45/28* (2013.01); *H04L 45/68* (2013.01)

(58) Field of Classification Search
CPC .................. H04L 41/0654; H04L 12/4641
USPC ......................................... 370/219
See application file for complete search history.

(56) References Cited

U.S. PATENT DOCUMENTS 8,170,033 B1 * 5/2012 Kothari et al. ........... 370/395.53
8,670,299 B1 * 3/2014 Shukla et al. ................. 370/216
(Continued)

FOREIGN PATENT DOCUMENTS

CN  101340351  1/2009
CN  101345715  1/2009
(Continued)

OTHER PUBLICATIONS

Search Report, dated May 7, 2014, in corresponding Chinese Application No. 201110073459.0 (2 pages).
(Continued)

*Primary Examiner* — Shripal Khajuria
*Assistant Examiner* — Faisal Choudhury
(74) *Attorney, Agent, or Firm* — Staas & Halsey LLP (57) ABSTRACT

Embodiments of the present invention provide a VPLS fast rerouting method and device. The method includes: generating, by a remote PE, a backup forwarding entry; and when a designated forwarder or a designated forwarder pseudo wire in a multihoming protection group fails, or the designated forwarder is switched in the multihoming protection group, forwarding, by the remote PE, a data packet according to the backup forwarding entry, thereby avoiding broadcasting the data packet to all remote PEs that belong to the same VPLS instance, and further reducing a waste of bandwidth resources in a backbone network and processing resources of the PE.

8 Claims, 6 Drawing Sheets

(56) References Cited

U.S. PATENT DOCUMENTS

| 8,724,456 | B1* | 5/2014 | Hong et al. ............... 370/225 |
|---|---|---|---|
| 2008/0154339 | A1 | 6/2008 | Carter |
| 2010/0329109 | A1* | 12/2010 | Kothari et al. ............. 370/216 |
| 2011/0235595 | A1* | 9/2011 | Mehta et al. ............... 370/329 |
| 2012/0177054 | A1* | 7/2012 | Pati et al. ............... 370/395.53 |

FOREIGN PATENT DOCUMENTS

| CN | 101582834 | | 11/2009 |
|---|---|---|---|
| CN | 101820397 | | 9/2010 |
| CN | 101924654 | | 12/2010 |
| CN | 101931520 | A | 12/2010 |
| CN | 101977150 | | 2/2011 |
| EP | 1909435 | | 4/2005 |
| EP | 2273735 | | 1/2011 |

OTHER PUBLICATIONS

Office Action, dated Jun. 10, 2014, in corresponding Chinese Application No. 201110073459.0 (7 pages).
International Search Report mailed May 31, 2012 in corresponding International Application No. PCT/CN2012/072209.
Extended European Search Report issued Nov. 18, 2013, in corresponding International Patent Application No. PCT/CN2012072209.
L. Anderson, Ed., et al., "Framework for Layer 2 Virtual Private Networks (L2VPNs)", Network Working Group, Category: Informational, Sep. 2006, pp. 1-44.
K. Kompella, Ed., et al., "Virtual Private LAN Service (VPLS) Using BGP for Auto-Discovery and Signaling", Network Working Group, Category: Standards Track, Jan. 2007, pp. 1-28.
M. Lasserre, Ed., et al., "Virtual Private LAN Service (VPLS) Using Label Distribution Protocol (LDP) Signaling", Network Working Group, Category: Standards Track, Jan. 2007, pp. 1-31.
B. Kothari, et al., "BGP based Multi-homing in Virtual Private LAN Service draft-ietf-l2vpn-vpls-multihoming-01", L2VPN Working Group, Jul. 12, 2010, pp. 1-19.
PCT International Search Report and Written Opinion of the International Searching Authority issued May 31, 2012, in corresponding International Patent Application No. PCT/CN2012/072209.
Chinese Office Action dated Jan. 13, 2015 in corresponding Chinese Patent Application No. 201110073459.0.
Chinese Office Action dated Jul. 3, 2015 in corresponding Chinese Patent Application No. 201110073459.0 (10 pages).

* cited by examiner

| U | Message Type =0x703 | Message Length |
|---|---|---|
| Messgae ID |||
| Type= 0x0005 (ICC RG ID) || Length =4 |
| ICC RG ID |||
| Application Specific TLVs (Variable) |||

FIG. 3

| U | Message Type =0x703 | Message Length |
|---|---|---|
| Messgae ID |||
| Type= 0x0005 (ICC RG ID) || Length =4 |
| ICC RG ID |||
| PW ID TLV/ Generalized PW ID T |||
| PW-RED MAC TLV |||

VPLS FAST REROUTING METHOD AND DEVICE

CROSS-REFERENCE TO RELATED APPLICATIONS

This application is a continuation of International Application No. PCT/CN2012/072209, filed on Mar. 12, 2012, which claims priority to Chinese Patent Application No. 201110073459.0, filed on Mar. 25, 2011, both of which are hereby incorporated by reference in their entireties.

TECHNICAL FIELD

Embodiments of the present invention relate to the network communications field, and in particular to a Virtual Private Local area network Service (VPLS) fast rerouting method and device.

BACKGROUND

The VPLS is a layer-2 virtual private network VPN (Virtual Private Network) technology based on the Internet Protocol (IP)/Multiprotocol Label Switching (MPLS) and Ethernet. A main purpose of the VPLS is to use a public packet switched network to connect user stations that are separated in physical locations, so that the user stations work as if they are located in a local area network. In a VPLS network, fully-meshed point-to-point pseudo wires PWs (Pseudo Wires) are established between PEs (Provider Edges), and a service provider may provide Ethernet-based multipoint-to-multipoint services for users through an IP/MPLS backbone network. For the purpose of improving reliability of services, normally a CE (Customer Edge) is connected to multiple PEs in the VPLS network through multiple links, which is referred to as multihoming. When a CE-PE link or a PE thereof fails, another link and another PE may still ensure accessibility of services. For the purpose of avoiding a traffic forwarding loop in this networking scenario, one of the multiple PEs connected to the CE is selected as a designated forwarder DF (Designated Forwarder) for traffic forwarding, and meanwhile, through a multihoming information advertisement mechanism or through a manual configuration, a remote PE may learn associations between the multiple PEs connected to the same CE.

According to an existing VPLS processing mechanism, a PE learns Media Access Control (MAC) addresses according to received data packets, and establish a MAC forwarding table. For example, in a VPLS network, fully-meshed PW connections are established between PEs that belong to the same VPLS, where CE1 is dual-homed to access PE1 and PE2, and pseudo wire connections between the PE1 and a remote PE3 and between the PE2 and the PE3 are a PW1 and a PW2 respectively. After the PE1 is elected as a designated forwarder, the PE1 is responsible for forwarding data packets sent to the CE1 and data packets sent by the CE1, and corresponding MAC addresses learned by the remote PE3 from received data packets are associated with the pseudo wire PW1. If the PW1 or PE1 fails, the PE3 broadcasts data packets destined to the CE1 to all remote PEs that belong to a same VPLS instance. This will occupy a lot of precious bandwidth resources of the backbone network and processing resources of the PE3.

SUMMARY

An embodiment of the present invention provides a VPLS fast rerouting method, where the method includes:

generating, by a remote PE, a backup forwarding entry according to media access control MAC address information learned from a first pseudo wire, where the MAC address information in the backup forwarding entry is associated with every pseudo wire among non-designated forwarder pseudo wires, a first PE acting as a designated forwarder in a multihoming protection group is connected to the remote PE through the first pseudo wire, and other PEs acting as non-designated forwarders in the multihoming protection group are connected to the remote PE through the non-designated forwarder pseudo wires; and when the first pseudo wire fails, the first PE fails, or one of the other PEs acting as non-designated forwarders is switched to act as the designated forwarder, forwarding, by the remote PE, a packet by using the backup forwarding entry.

An embodiment of the present invention further provides a VPLS fast rerouting device, where the device includes:

a MAC address information acquiring unit, configured to acquire source media access control MAC address information from a data packet received through a first pseudo wire PW;

a multihoming protection group information acquiring unit, configured to acquire information about a multihoming protection group formed by a first PE acting as a designated forwarder and other PEs acting as non-designated forwarders, where the first PE and the other PEs are connected to the device;

a backup forwarding entry generating unit, configured to generate a backup forwarding entry according to the source MAC address information acquired by the MAC address information acquiring unit and the information about the multihoming protection group acquired by the multihoming protection group information acquiring unit, where the source MAC address information in the backup forwarding entry is associated with every pseudo wire among non-designated forwarder pseudo wires, the first PE in the multihoming protection group is connected to the device through the first pseudo wire, and the other PEs acting as non-designated forwarders are connected to the device through the non-designated forwarder pseudo wires; and a packet forwarding unit, configured to forward the packet by using the backup forwarding entry when the first PW fails, the first PE fails, or the designated forwarder is switched.

An embodiment of the present invention further provides a VPLS fast rerouting method, where the method includes:

receiving, by a non-designated forwarder PE in a multihoming protection group, MAC forwarding table information sent by a designated forwarder PE;

generating a MAC forwarding entry of the non-designated forwarder PE by replacing an identifier of a pseudo wire connecting the designated forwarder PE and a remote PE in the MAC forwarding table information with an identifier of a pseudo wire connecting the non-designated forwarder PE and the remote PE and/or replacing an identifier of an attachment circuit connecting the designated forwarder PE and a CE in the MAC forwarding table information with an identifier of an attachment circuit connecting the non-designated forwarder PE and the CE; and when the designated forwarder PE fails, the pseudo wire connecting the designated forwarder PE and the remote PE fails, or the designated forwarder is switched in the multihoming protection group, forwarding, by the PE that receives a data packet and is in the multihoming protection group, the data packet by using the MAC forwarding entry of the PE.

An embodiment of the present invention further provides a VPLS fast rerouting device, where the device includes:

a MAC forwarding table information receiving unit, configured to receive MAC forwarding table information of a designated forwarder PE sent by the designated forwarder PE in a multihoming protection group;

a MAC forwarding entry generating unit, configured to generate a MAC forwarding entry of the fast rerouting device by replacing an identifier of a pseudo wire connecting the designated forwarder PE and a remote PE in the MAC forwarding table information with an identifier of a pseudo wire connecting the fast rerouting device and the remote PE and/or replacing an identifier of an attachment circuit connecting the designated forwarder PE and a CE in the MAC forwarding table information with an identifier of an attachment circuit connecting the fast rerouting device and the CE, where the fast rerouting device is a non-designated forwarder; and a packet forwarding unit, configured to forward, by the fast rerouting device receiving a data packet, the data packet by using the MAC forwarding entry of the fast rerouting device when the designated forwarder PE in the multihoming protection group or the pseudo wire connecting the designated forwarder PE and the remote PE fails, or the fast rerouting device is switched to act as the designated forwarder.

According to the VPLS fast rerouting method provided in the embodiments of the present invention, a remote PE generates a backup forwarding entry; and when a designated forwarder or a designated forwarder pseudo wire in a multihoming protection group fails, or the designated forwarder is switched in the multihoming protection group, the remote PE forwards a data packet according to the backup forwarding entry, thereby avoiding broadcasting the data packet to all remote PEs that belong to a same VPLS instance, and further reducing a waste of bandwidth resources in a backbone network and processing resources of the PE. By using the preceding VPLS fast rerouting method, the VPLS fast rerouting device provided in the embodiments of the present invention can also achieve the effect of reducing a waste of bandwidth resources in the backbone network and processing resources of the PE.

DESCRIPTION OF EMBODIMENTS

For better understanding of the objectives, technical solutions, and advantages of the embodiments of the present invention, the following describes in further detail the present invention with reference to accompanying drawings.

Embodiment 1

Figure 1:
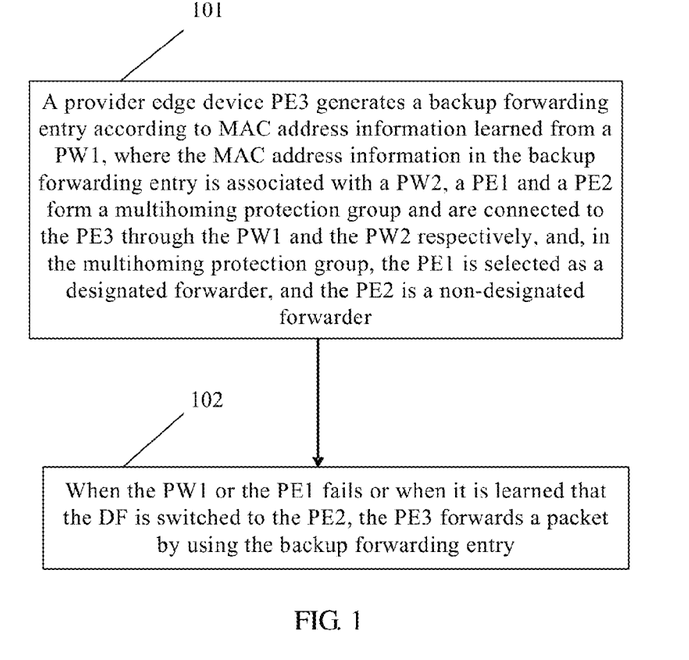
FIG. 1 is a flowchart of a VPLS fast rerouting method according to an embodiment of the present invention.

Referring to FIG. 1, embodiment 1 of the present invention provides a VPLS fast rerouting method, where the method includes:

101. A PE3 generates a backup forwarding entry according to MAC address information learned from a PW1, where the MAC address information in the backup forwarding entry is associated with a PW2, a PE1 and a PE2 form a multihoming protection group and are connected to the PE3 through the PW1 and the PW2 respectively, and, in the multihoming protection group, the PE1 is selected as a designated forwarder, and the PE2 is a non-designated forwarder.

Figure 2:
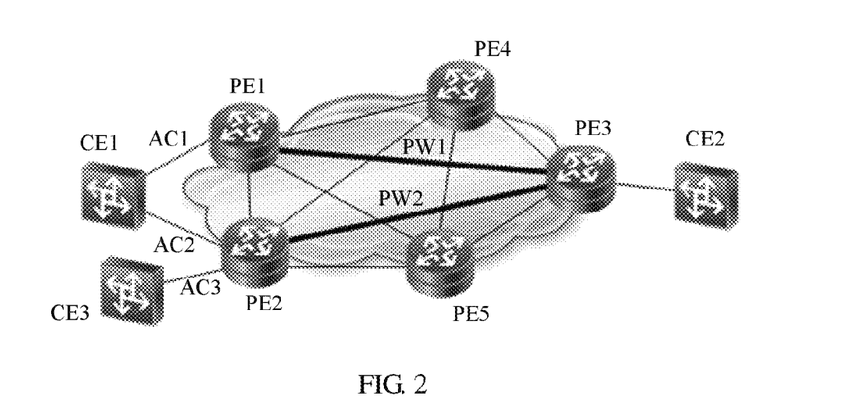
FIG. 2 is a schematic diagram of a system to which a VPLS fast rerouting method applies according to an embodiment of the present invention.

As shown in FIG. 2, the PE1, the PE2, the PE3, a PE4, and a PE5, and a CE1, a CE2, and a CE3 belong to a same VPLS. The CE1 is dual-homed to access the PE1 and the PE2 through an AC1 and an AC2 respectively, and the PE1 and the PE2 are connected to the PE3 through the PW1 and the PW2 respectively, where the PE1 and the PE2 form a multihoming protection group. Through a multihoming information advertisement mechanism or through a manual configuration, the PE3 learns that the PE1 and the PE2 belong to the same multihoming protection group and that the PE1 and the PE2 are multihomed PEs of the CE1. In the multihoming protection group, one PE is selected as a designated forwarder, and the other PE is a non-designated forwarder. For example, if the PE1 is selected as a designated forwarder, the PE2 is a non-designated forwarder. Here the PW2 between the PE2 and the PE3 may be referred to as a non-designated forwarder pseudo wire. Because the PE2 is a non-designated forwarder, an AC2 between the PE2 and the CE1 is in blocked state. The CE1 sends a data packet destined to the CE2 to the PE1 through an AC1; the PE1 sends the data packet to the PE3 through the PW1 according to a MAC forwarding entry of the PE1; when the PE3 receives the data packet from the CE1 through the PW1, the PE3 learns a source MAC address from the received data packet, where the source MAC address may exemplarily be a MAC address of the CE1, and may also be a MAC address of a customer device (not illustrated in the figure) connected to the CE1; and the PE3 generates a primary forwarding entry according to the learned source MAC address, where the learned source MAC address in the primary forwarding entry is associated with the PW1 and is used to guide forwarding of the data packet whose destination MAC address is the CE1 or a customer device connected to the CE1. In addition, the PE3 binds the source MAC address learned from the data packet received through the PW1 with the pseudo wire PW2 to generate a backup forwarding entry.

For example, when the PE3 receives a data packet whose source MAC address is HH-HH-HH-HH-HH-HH from the PW1, the PE3 generates a primary forwarding entry, where the MAC address HH-HH-HH-HH-HH-HH in the primary forwarding entry is associated with the PW1; meanwhile, the PE3 further generates a backup forwarding entry, where the HH-HH-HH-HH-HH-HH in the backup forwarding entry is associated with the PW2.

102. When the PW1 or the PE1 fails or when it is learned that the DF is switched to the PE2, the PE3 forwards the packet by using the backup forwarding entry.

For example, the PE3 may use a detection mechanism, such as BFD or LSP-Ping, to detect failures of the PW1 and the PE1; when the PE3 detects that the PW1 or the PE1 fails, or the PE3 receives from the PE1 or PE2 a notification that the DF is switched to the PE2, the PE3 does not wait for a process of relearning the MAC address, but directly sends, by using the backup forwarding entry, data by unicast through the PW2. For example, if, when the PE3 receives from the CE2 a data packet whose destination address is the MAC address of the CE1 or whose destination address is the MAC address of the customer device connected to the CE1, the PE3 detects that the PW1 fails, or detects that the PE1 fails, or learns that the DF is switched to the PE2, the PE3 queries the backup forwarding entry and finds that the destination address of the data packet is bound with the PW2, and therefore, sends the data packet to the PW2 by unicast, thereby avoiding broadcasting the data packet destined to the CE1 to all provider edge devices PE1, PE2, PE4, and PE5 that belong to the same VPLS, and further reducing an unnecessary waste of bandwidth resources in a backbone network and processing overhead.

If, when the PE2 receives from the PE3 a data packet destined to the CE1 or the customer device connected to the CE1, the PE2 is switched to act as the designated forwarder, because the PE2 has not learned the MAC address of the CE1 and the MAC address of the customer device connected to the CE1, the PE2 broadcasts the data packet received through the PW2 to all local interfaces AC2 and AC3 that belong to a same VPLS instance, thereby causing a waste of bandwidth resources and processing resources; and if, in this case, the PE2 is not switched to act as the designated forwarder, an attachment circuit AC between the PE2 and the CE1 is still in blocked state, and the PE2 cannot send the data packet to the CE1 through the attachment circuit AC2, thereby causing an interruption of the service. For a CE1 side, when the PE2 is selected as a new designated forwarder because the AC1, the PW1, or the PE1 fails, the CE1 sends, by using the AC2, the data packet destined to the CE2 to the PE2, and at this time, the PE2 has not learned MAC address information of a remote PE through a data plane, and therefore, can only send the data packet to all remote PEs that belong to the same VPLS in a broadcasting manner, namely, PE3-PE5, thereby causing a waste of bandwidth resources in the backbone network and processing resources of the PE2.

Figure 3:
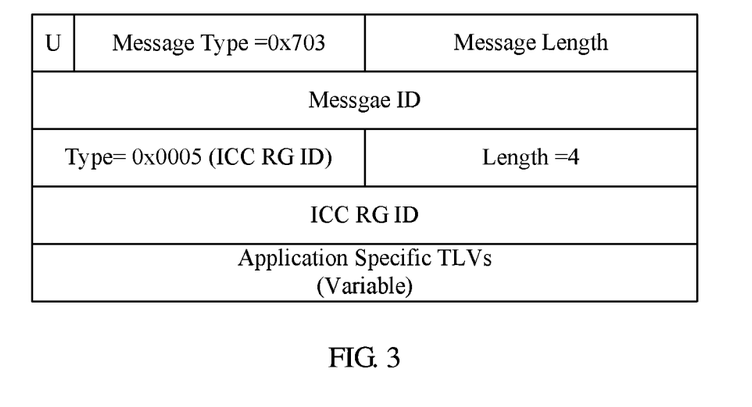
FIG. 3 is a schematic diagram of a format of a redundancy protection group application data message RG Application Data Message using the ICCP protocol in a VPLS fast rerouting method according to an embodiment of the present invention.

To avoid the preceding problem, synchronization of MAC forwarding table information may be performed between the dual-homed PE1 and PE2 of the CE1; when the PE2 receives a data packet whose destination address is a MAC address of the CE2 or whose destination address is a MAC address of a customer device connected to the CE2, the PE2 directly forwards, by using the MAC forwarding table information synchronized from the PE1, data to the PE3 by unicast, without broadcasting it to the PE3, PE4, and PE5 that belong to the same VPLS; when the PE2 receives a data packet whose destination address is a MAC address of the CE1 or whose destination address is a MAC address of a customer device connected to the CE1, the PE2 directly forwards, by using the MAC forwarding table information synchronized from the PE1, data to the AC2 by unicast, without broadcasting it to the AC2 and AC3 that belong to the same VPLS. The synchronization of MAC forwarding table information includes synchronization of AC-side MAC address information and synchronization of PW-side MAC address information. Synchronization of MAC forwarding table information between the PE1 and the PE2 may be implemented by extending an existing control protocol and may also be implemented by defining a new control protocol. For example, a state interaction protocol may run between the PE1 and the PE2 and the state interaction protocol is extended to implement synchronization of MAC forwarding table information between the PE2 and the PE1. The specific operation is as follows: The PE1 acting as a designated forwarder synchronizes the MAC forwarding table information learned from the AC1 and the MAC forwarding table information learned from the PW1 to the PE2, and the PE2 generates a corresponding MAC forwarding entry. For example, the Inter-Chassis Communications Protocol ICCP (Inter-Chassis Communication Protocol) may be extended to implement synchronization of the MAC forwarding table information between the PE1 and the PE2. For example, an application specific type-length-value Application Specific TLV in a redundancy protection group application data message RG Application Data Message of the ICCP protocol is used to carry the MAC forwarding table information to synchronize the MAC forwarding table information between the PE1 and the PE2. The format of the RG Application Data Message is shown in FIG. 3, where the Application Specific TLV may carry particular application specific information. For example, two methods may be used to extend the ICCP protocol to synchronize the MAC forwarding table information between the PE1 and the PE2:

Method 1: Two application type-length-values are defined: PW-RED MAC TLV and mLACP MAC TLV, where the PW-RED MAC TLV is used to carry MAC address information learned from a PW side in the multihoming protection group, and the mLACP MAC TLV is used to carry MAC address information learned from an AC side in the multihoming protection group.

For example, the Value field in the PW-RED MAC TLV may carry a MAC forwarding entry in the following format:

<Action, VPLS ID, VLAN ID, MAC Address, PW ID>; and the Value field in the mLACP MAC TLV may carry a MAC forwarding entry in the following format:

<Action, VPLS ID, VLAN ID, MAC Address, AC ID>.

The Action field indicates whether an operation for the MAC forwarding entry is Add or Remove.

The VPLS ID field identifies a VPLS instance to which the MAC forwarding entry belongs.

The VLAN ID field identifies a virtual local area network VLAN (Virtual Local Area Network) to which the MAC forwarding entry belongs.

The VPLS ID and VLAN ID are used to identify a MAC forwarding table to which a synchronized MAC address belongs; the PE generates different MAC forwarding tables according to different VPLS IDs or (VPLS IDs+VLAN IDs). For PEs in the same protection group, synchronization of the MAC address is also performed according to a particular VPLS ID or (VPLS ID+VLAN ID).

The MAC Address field in the PW-RED MAC TLV indicates a MAC address learned from a PW, and the PW ID is a PW identifier associated with the MAC address.

The MAC Address field in the mLACP MAC TLV indicates a MAC address learned from an AC, and the AC ID is a port identifier associated with the MAC address.

Method 2: MAC forwarding table information learned from both an AC side and a PW side is uniformly carried by a newly defined application type-length-value VPLS MAC TLV, where an example of a Value field of the VPLS MAC TLV may be:

<Action, VPLS ID, VLAN ID, MAC Address, Interface Type, Interface ID>.

The Action field indicates whether an operation for the MAC entry is Add or Remove.

The VPLS ID field identifies a VPLS instance to which the MAC forwarding entry belongs.

The VLAN ID field identifies a VLAN to which the MAC forwarding entry belongs.

The VPLS ID and VLAN ID are used to identify a MAC forwarding table to which a synchronized MAC address belongs; the PE generates different MAC forwarding tables according to different VPLS IDs or (VPLS IDs+VLAN IDs). For PEs in the same protection group, synchronization of the MAC address is also performed according to a particular VPLS ID or (VPLS ID+VLAN ID).

The MAC Address field indicates a learned MAC address; the Interface Type is used to identify whether the MAC address information is learned from an AC-side link or a network-side PW; and the Interface ID identifies an AC link port or PW ID information associated with the carried MAC address information.

Figure 4:
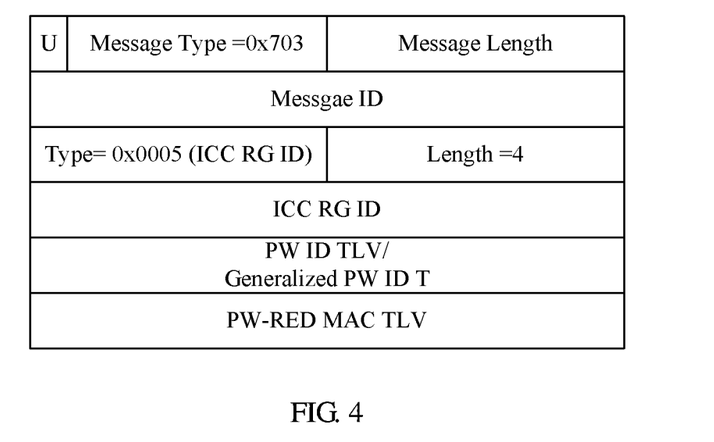
FIG. 4 is a schematic diagram of a format of an RG Application Data Message for synchronizing MAC forwarding table information in a VPLS fast rerouting method according to an embodiment of the present invention, where a PW-RED MAC TLV in the message does not include PW ID information.

In the two preceding methods, the newly defined TLVs may also not carry PW ID or AC ID information, and instead, an existing application TLV is used to provide the information. In this case, the RG Application Data Message for synchronizing MAC forwarding table information needs to carry the newly defined PW-RED MAC TLV, mLACP MAC TLV, or VPLS MAC TLV, and an existing TLV for identifying the PW and that for identifying the AC, for example, "PW ID TLV", "Generalized PW ID TLV", or "mLACP Port Config TLV". FIG. 4 is a schematic diagram of a format of an example of an RG Application Data Message for synchronizing MAC forwarding table information when a PW-RED MAC TLV in the message does not include PW ID information. The RG Application Data Message includes a PW ID TLV or a Generalized PW ID TLV in addition to the PW-RED MAC TLV, where either the PW ID TLV or Generalized PW ID TLV may be selected according to deployment of the PW in the network. In this way, if an Application Data Message is used to synchronize multiple pieces of MAC address information learned from a same PW, every Application Data Message needs to carry only one piece of PW ID information, but may carry multiple pieces of MAC address information associated with the PW ID, thereby improving synchronization efficiency of MAC forwarding table information. The format of the RG Application Data Message for synchronizing MAC forwarding table information when the newly defined mLACP MAC TLV does not include AC ID information is similar to that of the RG Application Data Message when the newly defined PW-RED MAC TLV does not include the PW ID information, and the only difference is that the PW ID TLV or the Generalized PW ID TLV in the RG Application Data Message is replaced with the existing TLV that may identify the AC ID, for example, being replaced with the mLACP Port Config TLV defined in ICCP.

After receiving the MAC forwarding table information synchronized from the PE1, the PE2 generates, according to the PW ID or AC ID information thereof and multihoming protection group configuration information, a MAC forwarding entry associated with the PW2 or the AC2.

For example, when the PE2 receives the following information synchronized from the PE1:

<VPLS A, VLAN B, MAC Address HH-HH-HH-HH-HH-HH, PW1>, because the PW2 and the PW1 belong to a same multihoming protection group (Redundancy Group), the PE2 locally generates the following forwarding entry:

<VPLS A, VLAN B, MAC Address HH-HH-HH-HH-HH-HH, PW2>.

When the PE2 receives the following information synchronized from the PE1:

<VPLS A, VLAN B, MAC Address HH-HH-HH-HH-HH-HH, AC1>, because the AC1 and the AC2 belong to a same multihoming protection group (Redundancy Group), the PE2 locally generates the following forwarding entry:

<VPLS A, VLAN B, MAC Address HH-HH-HH-HH-HH-HH, AC2>.

If, after synchronization of MAC forwarding table information between the PE1 and the PE2 is completed, the PW1 or the PE1 fails, for the data packet traffic sent from the CE2 to the CE1: if, when the PE2 receives a data packet from the PW2, the designated forwarder is switched to the PE2, the PE2 may use the local forwarding entry generated according to the MAC forwarding table information synchronized from the PE1 to directly forward data to the AC2 by unicast, where, for a Qualified learning mode, the PE2 performs forwarding to the AC2 that belongs to VLAN B of VPLS A, without broadcasting on all ACs that belong to VLAN B of VPLS A, and for an unqualified learning Unqualified learning mode, the PE2 performs forwarding to the AC2 that belongs to VPLS A, without broadcasting on all ACs that belong to VPLS A; and if, when the data packet traffic from the PW2 is received, the PE2 is not switched to act as the designated forwarder, for the purpose of avoiding generation of a forwarding loop, the data packet is sent by unicast according to the forwarding entry only when an entry matching a destination MAC address of the data packet can be found in a MAC forwarding table of the PE2, and for an unknown unicast packet, broadcast packet, and multicast packet for which no forwarding entry corresponding to a destination MAC address of the packet cannot be found in the forwarding table, the AC2 is still in the blocked state, that is, the PE2 does not send the data packet to the AC2. After synchronization of MAC forwarding table information between the PE1 and the PE2 is completed, because the MAC forwarding table of the PE2 includes a forwarding entry where the MAC address of the CE1 is associated with the AC2 and a forwarding entry where the MAC address of the customer device connected to the CE1 is associated with the AC2, the PE2 directly forwards, to the AC2 by unicast according to a table lookup result of the MAC forwarding table, the data packet whose destination address is the MAC address of the CE1 or the MAC address of the customer device connected to the CE1.

For customer data traffic sent from the CE1 to the CE2, when the AC1, PE1, or PW1 fails, the designated forwarder is switched to the PE2 through synchronization of state information, and at this time, the CE1 sending, by using the AC2, a data packet to the PE2. Though the PE2 has not learned remote MAC address information through the data plane at this time, by using a mechanism that is for synchronizing MAC forwarding table information between the PE1 and the PE2 provided in this embodiment and where the MAC forwarding table of the PE2 includes a forwarding entry that associates the MAC address of the remote CE2 and the MAC address of the customer device connected to the CE2 with the PW2, and the PE2 directly forwards, to the PW2 by unicast according to the table lookup result of the MAC forwarding table, the data packet whose destination address is the MAC address of the CE2 and the data packet whose destination address is the MAC address of the customer device connected to the CE2, thereby avoiding unnecessary data broadcasting in the backbone network.

For example, after the designated forwarder is switched in the multihoming protection group, the PE switched to act as the designated forwarder may synchronize its MAC forwarding table information to a non-designated forwarder PE in the multihoming protection group; the non-designated forwarder PE generates its MAC forwarding entry according to the received MAC forwarding table information of the designated forwarder PE, so as to guide forwarding of a data packet when a PW fails or the designated forwarder fails. For example, the PE2 switched to act as the designated forwarder sends its MAC forwarding table information to the PE1; after receiving the MAC forwarding table information of the PE2, the PE1 generates its corresponding MAC forwarding entry to guide forwarding of the data packet when the PW2 or the PE2 fails or when the PE1 is switched again to act as the designated forwarder.

Figure 5:
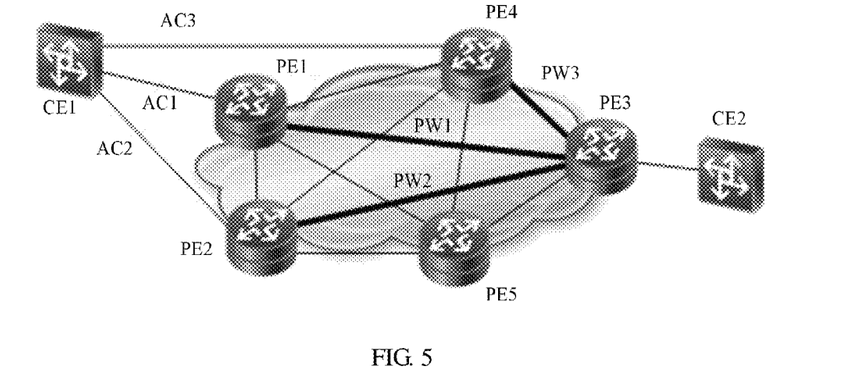
FIG. 5 is a schematic diagram of a system in which a multihoming protection group has multiple PEs and to which a VPLS fast rerouting method is applied according to an embodiment of the present invention.

The VPLS fast rerouting method provided in the embodiment of the present invention may also apply to a case that the multihoming protection group includes multiple PEs. As shown in FIG. 5, the multihoming protection group includes three PEs: a PE1, a PE2, and a PE4. The PE1, PE2, and PE4 access a PE3 through pseudo wires PW1, PW2, and PW3 respectively, and a CE1 accesses the PE1, PE2, and PE4 through attachment circuits AC1, AC2, and AC3 respectively. In the multihoming protection group, one PE thereof is selected as a designated forwarder, and other PEs are non-designated forwarders. For example, if the PE1 is selected as the designated forwarder, the PE2 and PE4 are non-designated forwarders. Here the pseudo wires PW2 and PW3 between the non-designated forwarder PE2 and the remote PE3 and between the PE4 and the PE3 are referred to as non-designated forwarder pseudo wires. Because the PE2 and the PE4 are non-designated forwarders, the AC2 and the AC3 between the PE2 and the CE1 and between the PE4 and the CE1 are in blocked state. The CE1 sends a data packet destined to a CE2 to the PE1 through the AC1; the PE1 sends the data packet to the remote PE3 through the PW1 according to an MAC forwarding entry of the PE1; when the PE3 receives the data packet from the CE1 through the PW1, the PE3 learns a source MAC address from the received data packet, where the source MAC address may exemplarily be a MAC address of the CE1 and may also be a MAC address of a customer device (not illustrated in the figure) connected to the CE1; the PE3 generates a primary forwarding entry according to the learned source MAC address, where the learned source MAC address in the primary forwarding entry is associated with the PW1 and then is used to guide forwarding of the data packet whose destination MAC address is the MAC address of the CE1 or whose destination MAC address is the MAC address of the customer device connected to the CE1. In addition, the PE3 binds the source MAC address learned from the data packet received through the PW1 with the pseudo wires PW2 and PW3 to generate a backup forwarding entry. For example, when the PE3 receives a data packet whose source MAC address is HH-HH-HH-HH-HH-HH from the PW1, the PE3 generates a primary forwarding entry, where the MAC address HH-HH-HH-HH-HH-HH in the primary forwarding entry is associated with the PW1; meanwhile, the PE3 further generates a backup forwarding entry, where the HH-HH-HH-HH-HH-HH in the backup forwarding entry is associated with the PW2 and PW3. When it is detected that the PW1 or the PE1 fails or when it is learned that the designated forwarder is switched, the PE3 forwards the packet by using the backup forwarding entry. For example, the PE3 may use a detection mechanism, such as BFD and LSP-Ping, to detect failures of the PW1 and the PE1; when the PE3 detects that the PW1 or the PE1 fails, or the PE3 receives from the PE1, the PE2, or the PE4 a notification that the designated forwarder is switched, the PE3 does not wait for a process of relearning the MAC address, but directly sends, by using the backup forwarding entry, the data packet through the pseudo wires PW2 and PW3 that belong to the same multihoming protection group as the PW1. For example, if, when the PE3 receives from the CE2 a data packet whose destination address is the MAC address of the CE1 or whose destination address is the MAC address of the customer device (not illustrated in the figure) connected to the CE1, the PE3 detects that the PW1 or the PE1 fails but no notification that the designated forwarder is switched is received, the PE3 queries the backup forwarding entry, finds that the destination MAC address of the received data packet is bound with the PW2 and the PW3, and therefore, sends the data packet to the PW2 and PW3 respectively; if at this time the PE3 has received a notification that the designated forwarder is switched, for example, the designated forwarder is switched to the PE4, the PE3 directly sends the data packet to the PW3 according to the backup forwarding entry. In the preceding two cases, broadcasting, by the PE3, the data packet destined to the CE1 to all PEs that belong to a same VPLS can be avoided, and an unnecessary waste of bandwidth resources in a backbone network and processing overhead can be reduced.

Likewise, in a case that the multihoming protection group includes multiple PEs, synchronization of MAC forwarding table information between the multiple PEs may also be implemented. As shown in FIG. 5, the PE1, the PE2, and the PE4 form a multihoming protection group; it is assumed that the PE1 in the multihoming protection group is selected as a designated forwarder, and then the PE2 and the PE4 are non-designated forwarders, for example, it is assumed that the PE1 is selected as the designated forwarder, and then the PE2 and the PE4 are non-designated forwarders. Here the pseudo wires PW2 and PW3 between the non-designated forwarder PE2 and the remote PE3 and between the PE4 and the PE3 are referred to as non-designated forwarder pseudo wires. The PE1 acting as the designated forwarder synchronizes MAC forwarding table information learned from the AC1 and the MAC forwarding table information learned from the PW1 to the non-designated forwarders PE2 and PE3 in the multihoming protection group; the PE2 and the PE3 generate their MAC forwarding entries according to the synchronized MAC forwarding table information. Synchronization of MAC forwarding table information between PEs in the multihoming protection group and the method for generating their MAC forwarding entries by the PE2 and PE3 according to the synchronized MAC forwarding table information are the same as those in the case that the multihoming protection group includes two PEs, and are not further described herein.

If, after synchronization of MAC forwarding table information between the PE1 and the PE3 and between the PE2 and the PE3 is completed, the PW1 or the PE1 fails, for the data packet traffic sent from the CE2 to the CE1: if, when the PE4 receives a data packet from the PW3, the multihoming protection group has completed switching of the designated forwarder, for example, the designated forwarder is switched from the PE1 to the PE4, the PE4 may use its MAC forwarding entry generated according to the MAC forwarding table information synchronized from the PE1 to directly forward data to the AC3 by unicast; and if, when data packet traffic from the PW3 is received, the PE4 is not switched to act as the designated forwarder, for the purpose of avoiding generation of a forwarding loop, the data packet is sent by unicast according to the forwarding entry only when a forwarding entry matching a destination MAC address of the data packet can be found in a MAC forwarding table of the PE4, and for an unknown unicast packet, broadcast packet, or multicast packet for which no forwarding entry corresponding to the destination MAC address of the packet cannot be found in the forwarding table, the AC3 is still in blocked state, that is, the PE4 does not send the data packet to the AC3. After synchronization of MAC forwarding table information between the PE1 and the PE4 and between the PE2 and the PE4 is completed, because the MAC forwarding table of the PE4 includes a forwarding entry where a MAC address of the CE1 is associated with the AC3 and a forwarding entry where a MAC address of a customer device connected to the CE1 is associated with the AC3, the PE4 directly forwards, to the AC3 by unicast according to a table lookup result of the MAC forwarding table, the data packet whose destination address is the MAC address of the CE1 or the MAC address of the customer device connected to the CE1.

For the customer data traffic sent from the CE1 to the CE2, when the AC1, the PE1, or the PW1 fails, it is assumed that the designated forwarder is switched to the PE4 through synchronization of state information, and at this time, the CE1 sends a data packet to the PE4 by using the AC3. Though the PE4 has not learned remote MAC address information through the data plane at this time, by using a mechanism that is for synchronizing MAC forwarding table information between the PE1 and the PE4 and between the PE2 and the PE4 provided in this embodiment and where a MAC forwarding table of the PE4 includes a forwarding entry that associates a MAC address of the CE2 and a MAC address of a customer device connected to the CE2 with the PW2, the PE4 directly forwards the data packet whose destination address is the MAC address of the CE2 and the data packet whose destination address is the MAC address of the customer device connected to the CE2 to the PW3 by unicast according to the table lookup result of the MAC forwarding table, thereby avoiding unnecessary data broadcasting in a backbone network.

Figure 6:
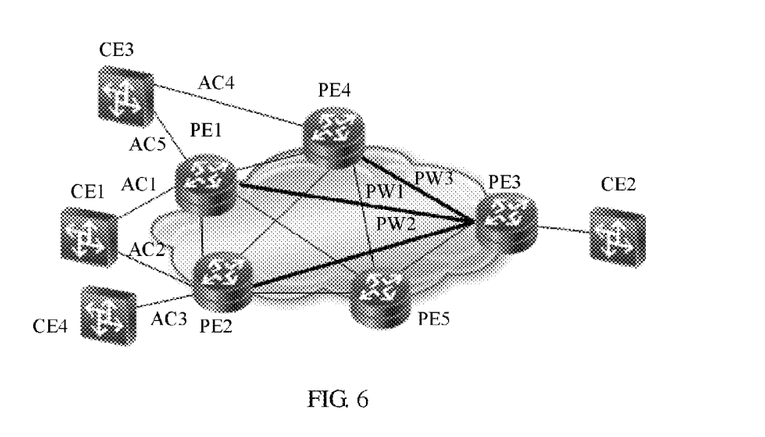
FIG. 6 is a schematic diagram of a system in which multiple multihoming protection groups have overlapped PEs and to which a VPLS fast rerouting method is applied according to an embodiment of the present invention.

The VPLS fast rerouting method provided in the embodiment of the present invention is also applicable to a scenario where multiple multihoming protection groups have overlapped PEs. As shown in FIG. 6, a PE1 and a PE4 form a multihoming protection group, and the PE1 and a PE2 also form a multihoming protection group. Two CE1 and CE3 belonging to a same VPLS are dual-homed to the two multihoming protecting groups respectively. In both of the two multihoming protection groups, the PE1 is selected as a designated forwarder. By using the VPLS fast rerouting method provided in the embodiment of the present invention, a remote PE3 generates a backup forwarding entry about the CE1 and the CE3 in addition to a primary forwarding entry about the CE1 and the CE3. In the primary forwarding entry of the PE3, a MAC address of the CE1 and that of a customer device connected to the CE1 are associated with a PW1, and a MAC address of the CE3 and that of a customer device connected to the CE3 are associated with the PW1; and in the backup forwarding entry, the MAC address of the CE1 and the MAC address of the customer device connected to the CE1 are associated with a PW2 and a PW3, and the MAC address of the CE3 and the MAC address of the customer device connected to the CE3 are associated with the PW2 and the PW3. When it is detected that the PE1 or the PW1 fails, the remote PE3 receives from a CE2 a data packet whose destination address is the MAC address of the CE1 or the CE3 or whose destination address is the MAC address of the customer device connected to the CE1 or the CE3, and therefore the PE3 sends the data packet to the PW2 and the PW3 respectively according to the backup forwarding entry. Here, the PE3 needs to send the received data packet to the PW2 and the PW3 respectively because the PE3 can only obtain, by MAC address learning in a the data plane, an association between the MAC addresses of the CE1 and the CE3 and the PW1 and an association between the MAC addresses of the customer devices connected to the CE1 and the CE3 and the PW1, and the PE3 only knows, by learning, that the MAC addresses come from the PW1, and also knows that the PW1 and the PW2 are in a primary/backup relationship, and that the PW1 and the PW3 are in a primary/backup relationship, but the PE3 cannot distinguish which multihoming protection group the MAC address learned from the PW1 belongs to. Therefore, when the PE1 or the PW1 fails, to ensure accessibility of data, the PE3 sends the received data packet to the PW2 and the PW3 respectively according to the backup forwarding entry. In a case that the PW1 and the PE1 do not fail but the designated forwarder is switched in a certain multihoming protection group, for example, in the multihoming protection group formed by the PE1 and the PE2, the designated forwarder is switched, and the PE2 is switched to act as the designated forwarder, the PE3 forwards, to the PW1 and the PW2 according to the backup forwarding entry, the data packet that is received through the CE2 and whose destination address is the MAC address of the CE1 or the CE3, or whose destination address is the MAC address of the customer device connected to the CE1 or the CE3.

In the preceding case, the amount of data that the PE3 needs to send increases to a certain extent, for example, the data destined to the CE3 is sent to the PE2 and the PE4 respectively. However, compared with broadcasting to the whole VPLS, this still saves a lot of bandwidth resources and processing resources. In addition, the increase in the data amount may be avoided through proper networking planning, for example, multiple CEs belonging to the same VPLS may be dual-homed to a same group of PEs. Therefore, the VPLS fast rerouting method provided in the embodiment of the present invention can still achieve the effect of reducing an unnecessary waste of bandwidth resources and processing overhead, and avoiding an interruption of a service between CEs in the case that multiple multihoming protection groups have overlapped PEs.

According to the VPLS fast rerouting method provided in the embodiment of the present invention, a remote PE generates a backup forwarding entry; and when a designated forwarder or a designated forwarder pseudo wire in a multihoming protection group fails, or the designated forwarder is switched in the multihoming protection group, the remote PE forwards a data packet according to the backup forwarding entry, thereby avoiding broadcasting the data packet to all remote PEs that belong to a same VPLS instance, and further reducing a waste of bandwidth resources in a backbone network and processing resources of the PE. Further, MAC forwarding table information is synchronized between PEs that are in the multihoming protection group and connected to the remote PE, and local MAC forwarding entries are generated according to the MAC forwarding table information; and, when the designated forwarder or the designated forwarder pseudo wire in the multihoming protection group fails, or when the designated forwarder is switched in the multihoming protection group, the PE receiving a data packet in the multihoming protection group forwards the data packet by using its MAC forwarding entry, thereby avoiding broadcasting the data packet to all remote PEs that belong to the same VPLS instance and all local interfaces, and avoiding a possible service interruption, and further reducing a waste of bandwidth resources in a backbone network and processing resources of the PE.

Embodiment 2

Figure 7:
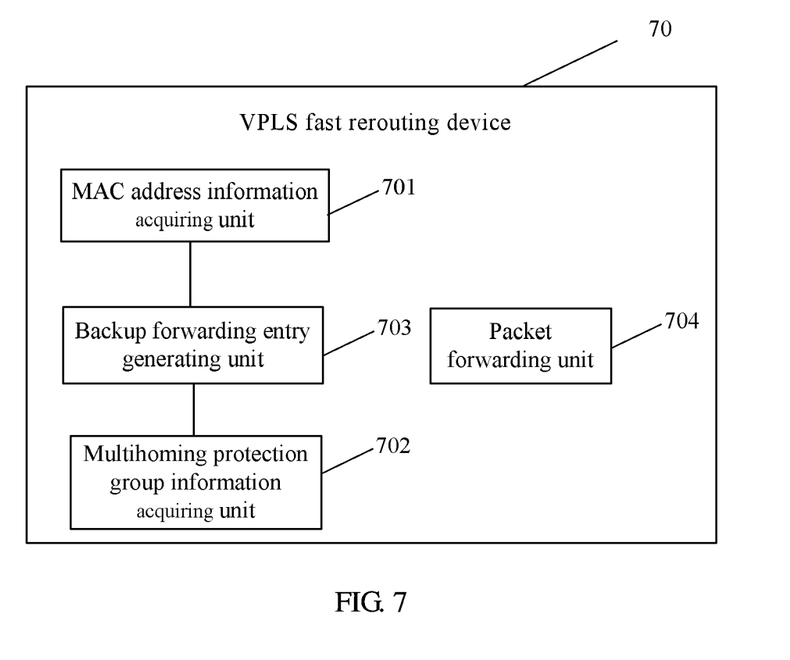
FIG. 7 is a schematic diagram of a VPLS fast rerouting device 70 according to an embodiment of the present invention.

As shown in FIG. 7, embodiment 2 of the present invention provides a VPLS fast rerouting device 70, where the VPLS fast rerouting device 70 may exemplarily be a PE3. Embodiment 2 takes a PE3 as the VPLS fast rerouting device 70 for description, where the PE3 includes:

a MAC address information acquiring unit 701, configured to acquire MAC address information from a data packet received through a pseudo wire PW1;

a multihoming protection group information acquiring unit 702, configured to acquire information about a multihoming protection group formed by a PE1 and a PE2, where the PE1 and the PE2 are connected to the PE3, the PE1 is selected as a designated forwarder in the multihoming protection group, and the PE2 acts as a non-designated forwarder;

a backup forwarding entry generating unit 703, configured to generate a backup forwarding entry according to the source MAC address information acquired by the MAC address information acquiring unit 701 and the information about the multihoming protection group acquired by the multihoming protection group information acquiring unit 702, where the source MAC address information in the backup forwarding entry is associated with a PW2, and the PE1 and the PE2 are connected to the PE3 through the PW1 and the PW2 respectively; and a packet forwarding unit 704, configured to forward the packet by using the backup forwarding entry when the PW1 fails, the PE1 fails, or the designated forwarder is switched.

As further shown in FIG. 2, a PE1, a PE2, a PE3, a PE4, and a PE5, and a CE1, a CE2, and a CE3 belong to a same VPLS. The CE1 is dual-homed to access the PE1 and the PE2 through an AC1 and an AC2 respectively, and the PE1 and the PE2 are connected to the PE3 through the PW1 and the PW2 respectively, where the PE1 and the PE2 form a multihoming protection group. Through a multihoming information advertisement mechanism or through a manual configuration, the multihoming protection group information acquiring unit 702 of the PE3 may acquire information about the multihoming protection group formed by the PE1 and the PE2, and thereby knows that the PE1 and the PE2 belong to the same multihoming protection group and they are dual-homed PEs of the CE1. In the multihoming protection group, one PE is selected as a designated forwarder, and the other PE is a non-designated forwarder. For example, if the PE1 is selected as the designated forwarder, the PE2 is the non-designated forwarder, and the AC2 between the PE2 and the CE1 is in blocked state. The CE1 sends a data packet destined to the CE2 to the PE1 through the AC1; the PE1 sends the data packet to the PE3 through the PW1 according to a MAC forwarding entry; when the PE3 receives the data packet from the CE1 through the PW1, the MAC address information acquiring unit 701 learns a source MAC address from the received data packet, where the source MAC address may exemplarily be a MAC address of the CE1, and may also be a MAC address of a customer device (not illustrated in the figure) connected to the CE1; a primary forwarding entry generating unit of the PE3 generates a primary forwarding entry according to the learned source MAC address, where the learned source MAC address in the primary forwarding entry is associated with the PW1 and then is used to guide forwarding of the data packet whose destination MAC address is the CE1 or whose destination MAC address is the customer device connected to the CE1; and the backup forwarding entry generating unit 703 binds the source MAC address learned from the data packet received through the PW1 with the pseudo wire PW2 to generate a backup forwarding entry.

For example, the MAC address information acquiring unit 701 of the PE3 acquires a source MAC address HH-HH-HH-HH-HH-HH from the data packet received through the PW1, and the primary forwarding entry generating unit generates a primary forwarding entry according to the learned source MAC address, where the MAC address HH-HH-HH-HH-HH-HH in the primary forwarding entry is associated with the PW1; and the backup forwarding entry generating unit 703 concurrently generates a backup forwarding entry according to the learned source MAC address, where the HH-HH-HH-HH-HH-HH in the backup forwarding entry is associated with the PW2.

For example, the PE3 may further include a failure detecting unit, where the failure detecting unit uses a detection mechanism, such as BFD and LSP-Ping, to detect failures of the PW1 and the PE1, or receives a notification that the designated forwarder is switched in the multihoming protection group. When the failure detecting unit detects that the PW1 or the PE1 fails, or receives a notification that the designated forwarder is switched to the PE2 and that is sent by the PE1 or the PE2, the failure detecting unit does not wait for a process of relearning the MAC address, and the packet forwarding unit 704 directly sends, according to the backup forwarding entry, data by unicast through the PW2. For example, if, when the PE3 receives from the CE2 a data packet whose destination address is the MAC address of the CE1 or whose destination address is the MAC address of the customer device connected to the CE1, the failure detecting unit detects that the PW1 fails, detects that the PE1 fails, or learns that the DF is switched to the PE2, the packet forwarding unit 704 queries the backup forwarding entry, finds that the MAC address of the CE1 and the MAC address of the customer device connected to the CE1 are bound with the PW2, and therefore, sends to the PW2 the data packet whose destination address is the MAC address of the CE1 or whose destination address is the MAC address of the customer device connected to the CE1, thereby avoiding broadcasting the data packet destined to the CE1 to all provider edge devices PE1, PE2, PE4, and PE5 that belong to the same VPLS, and further reducing an unnecessary waste of bandwidth resources in a backbone network and processing overhead.

The PE3 disclosed in this embodiment may also be used in a network where a multihoming protection group includes multiple PEs. For example, in the network shown in FIG. 5, the multihoming protection group includes three PEs: a PE3, a PE4, and a PE5. A CE1 accesses a PE1, a PE2, and the PE4 through attachment circuits AC1, AC2, and AC3 respectively. In the multihoming protection group, one PE thereof is selected as a designated forwarder, and other PEs are non-designated forwarders. For example, if the PE1 is selected as a designated forwarder, the PE2 and the PE4 are non-designated forwarders, and the AC2 between the PE2 and the CE1 and the AC3 between the PE4 and the CE1 are in blocked state. The CE1 sends a data packet destined to a CE2 to the PE1 through the AC1; the PE1 sends the data packet to the remote PE3 through a PW1 according to a MAC forwarding entry; when the PE3 receives the data packet from the CE1 through the PW1, the MAC address information acquiring unit 701 of the PE3 learns a source MAC address from the received data packet, where the source MAC address may exemplarily be a MAC address of the CE1, and may also be a MAC address of a customer device (not illustrated in the figure) connected to the CE1; a primary entry forwarding unit of the PE3 generates a primary forwarding entry according to the learned source MAC address, where the learned source MAC address in the primary forwarding entry is associated with the PW1 and then is used to guide forwarding of the data packet whose destination MAC address is the MAC address of the CE1 or whose destination MAC address is the MAC address of the customer device connected to the CE1. In addition, the backup forwarding entry generating unit 703 of the PE3 binds the source MAC address learned from the data packet received through the PW1 with pseudo wires PW2 and PW3 to generate a backup forwarding entry. For example, a failure detecting unit included in the PE3 may use a detection mechanism, such as BFD and LSP-Ping, to detect failures of the PW1 and the PE1 or receives from the PE1, PE2, or PE4 a notification that the designated forwarder is switched. When the failure detecting unit detects that the PW1 or PE1 fails, or receives a notification that the designated forwarder is switched and that is sent by the PE1 or the PE2, the PE3 does not wait for a process of relearning the MAC address, and the packet forwarding unit 704 of the PE3 directly sends, by using the backup forwarding entry, the data packet through the pseudo wires PW2 and PW3 that belong to the same multihoming protection group as the PW1. For example, the packet forwarding unit 704 in the PE3 further includes a failure forwarding unit; if, when the PE3 receives from the CE2 a data packet whose destination address is the MAC address of the CE1 or whose destination address is the MAC address of the customer device connected to the CE1, the failure detecting unit of the PE3 detects that the PW1 or the PE1 fails but no notification that the designated forwarder is switched is received, the failure forwarding unit queries the backup forwarding entry, finds that the destination MAC address of the received data packet is bound with the PW2 and the PW3, and therefore sends the data packet to the PW2 and PW3 respectively. The packet forwarding unit 704 in the PE3 further includes a designated forwarder forwarding unit; if, when the PE3 receives from the CE2 a data packet whose destination address is the MAC address of the CE1 or whose destination address is the MAC address of the customer device connected to the CE1, the failure detecting unit has received a notification that the designated forwarder is switched, for example, the designated forwarder is switched to the PE4, the designated forwarder forwarding unit directly sends the data packet to the PW3 according to the backup forwarding entry. In the preceding two cases, broadcasting, by the PE3, the data packet destined to the CE1 to all PEs that belong to the same VPLS can be avoided, and an unnecessary waste of bandwidth resources in a backbone network and processing overhead can be reduced.

According to the embodiment of the present invention, the VPLS fast rerouting device generates a backup forwarding entry; and when a designated forwarder or a designated forwarder pseudo wire in a multihoming protection group fails, or the designated forwarder is switched in the multihoming protection group, the VPLS fast rerouting device forwards a data packet according to the backup forwarding entry, thereby avoiding broadcasting the data packet to all remote PEs that belong to the same VPLS instance, and further reducing a waste of bandwidth resources in a backbone network and processing resources of the PE.

Embodiment 3

Figure 8:
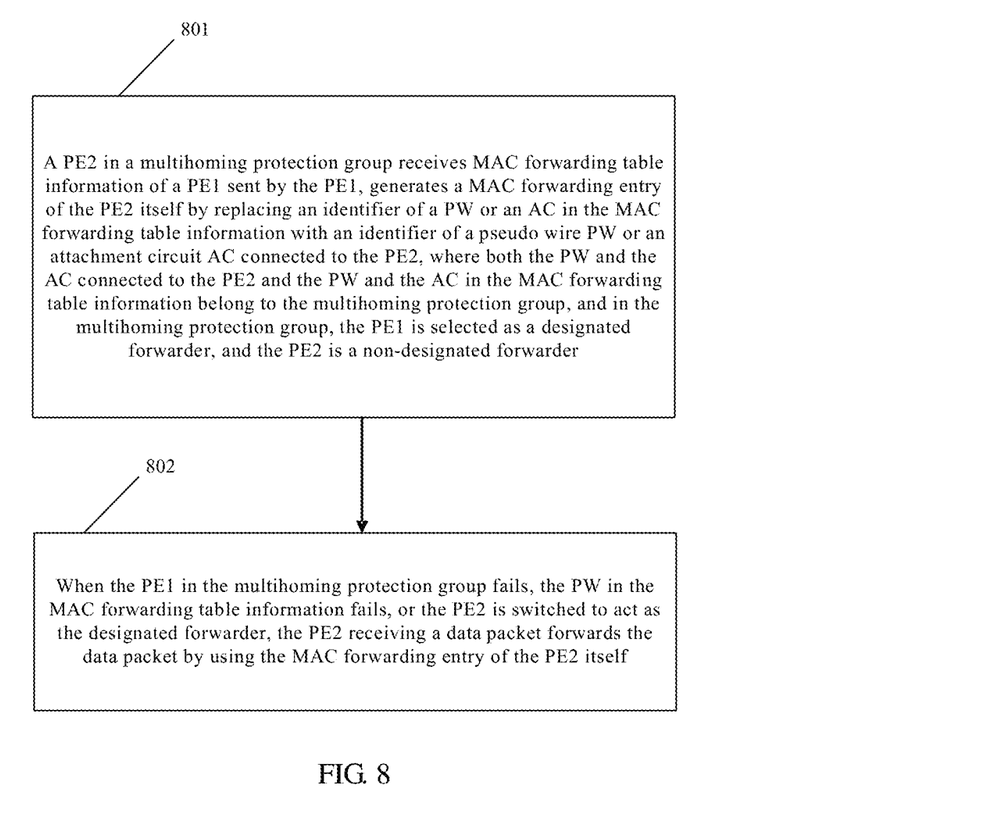
FIG. 8 is a flowchart of another VPLS fast rerouting method according to an embodiment of the present invention.

As shown in FIG. 8, embodiment 3 of the present invention provides a VPLS fast rerouting method, where the method includes the following:

801. A PE2 in a multihoming protection group receives MAC forwarding table information on a PE1 from the PE1, generates its MAC forwarding entry by replacing an identifier of a PW or an AC in the MAC forwarding table information with an identifier of a pseudo wire PW or an attachment circuit AC connected to the PE2, where both the PW and the AC connected to the PE2 and the PW and the AC in the MAC forwarding table information belong to the multihoming protection group, and in the multihoming protection group, the PE1 is selected as a designated forwarder, and the PE2 is a non-designated forwarder.

802. When the PE1 in the multihoming protection group fails, the PW in the MAC forwarding table information fails, or the PE2 is switched to act as the designated forwarder, the PE2 receiving a data packet forwards the data packet by using its MAC forwarding entry.

The VPLS fast rerouting method provided in embodiment 3 of the present invention is the same as the method for synchronizing MAC forwarding table information between PEs in a multihoming protection group, where the synchronization method is in the VPLS fast rerouting method provided in embodiment 1 of the present invention, and is not further described herein. Though this embodiment describes the method for synchronizing MAC forwarding table information between PEs by taking an example in which the VPLS multihoming protection group includes two PEs, same as the method for synchronizing MAC forwarding table information between multiple PEs in the multihoming protection group in embodiment 1, the VPLS fast rerouting method provided in embodiment 3 is also applicable to the case that a multihoming protection group includes multiple PEs, which is not further described herein.

According to the VPLS fast rerouting method provided in the embodiment of the present invention, MAC forwarding table information is synchronized between PEs in a multihoming protection group, and local MAC forwarding entries are generated according to the MAC forwarding table information; and when a designated forwarder or a designated forwarder pseudo wire in the multihoming protection group fails, or when the designated forwarder is switched in the multihoming protection group, the PE receiving a data packet forwards the data packet by using its MAC forwarding entry, thereby avoiding broadcasting the data packet to all remote PEs that belong to a same VPLS instance and all local interfaces, and avoiding a possible service interruption, and further reducing a waste of bandwidth resources in a backbone network and processing resources of the PE.

Embodiment 4

Figure 9:
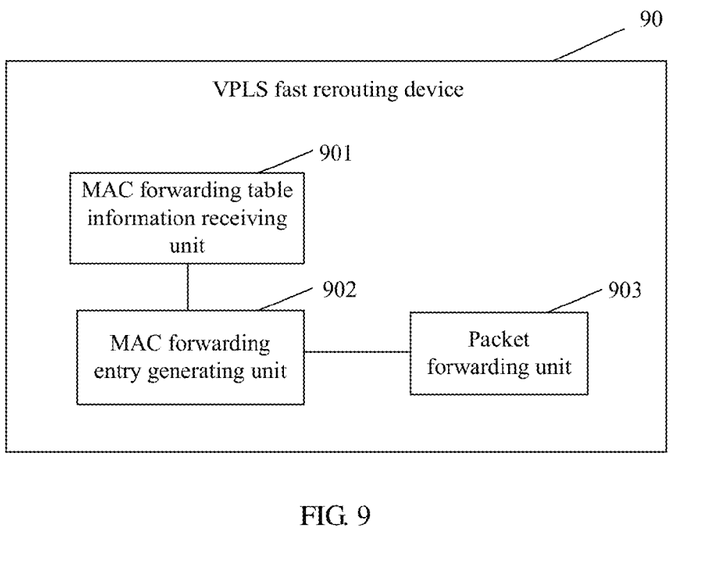
FIG. 9 is a schematic diagram of another VPLS fast rerouting device 90 according to an embodiment of the present invention.

As shown in FIG. 9, embodiment 4 of the present invention further provides a VPLS fast rerouting device, where the VPLS fast rerouting device 90 may exemplarily be a PE2. Embodiment 4 takes a PE2 as the VPLS fast rerouting device 90 for description, where the PE2 includes:

a MAC forwarding table information receiving unit 901, configured to receive MAC forwarding table information of a PE1 sent by the PE1 in a multihoming protection group;

a MAC forwarding entry generating unit 902, configured to generate a MAC forwarding entry of the PE2 itself by replacing identifiers of a PW and an AC that are in the MAC forwarding table information with identifiers of a pseudo wire and an AC that are connected to the PE2, where both the pseudo wire and the AC connected to the PE2 and the PW and AC in the MAC forwarding table information belong to the multihoming protection group; and a packet forwarding unit 903, configured to forward a data packet according to the MAC forwarding entry of the PE2 itself when the PE1 fails, or a PW1 fails, or the PE2 is switched to act as a designated forwarder.

As further shown in FIG. 2, a PE1, a PE2, a PE3, a PE4, and a PE5, and a CE1, a CE2, and a CE3 belong to a same VPLS. The CE1 is dual-homed to access the PE1 and the PE2 through an AC1 and an AC2 respectively, and the PE1 and the PE2 are connected to the PE3 through the PW1 and a PW2 respectively, where the PE1 and the PE2 form a multihoming protection group. In the multihoming protection group, one PE is selected as a designated forwarder, and the other PE is a non-designated forwarder. For example, if the PE1 is selected as a designated forwarder, the PE2 is a non-designated forwarder. Here the pseudo wire PW2 between the PE2 and the PE3 may be referred to as a non-designated forwarder pseudo wire. For example, the PE1 acting as the designated forwarder in the multihoming protection group may synchronize MAC forwarding table information learned from the AC1 and that learned from the PW1 to the PE2, where the synchronization may be implemented by extending an existing control protocol or by defining a new control protocol. The MAC forwarding table information receiving unit 901 included in the PE2 receives the MAC forwarding table information synchronized from the PE1, and the MAC forwarding entry generating unit 902 generates the MAC forwarding entry of the PE2 itself according to the MAC forwarding table information. For example, the MAC forwarding table information receiving unit 901 may include an Inter-Chassis Communications Protocol ICCP unit configured to receive an ICCP message sent by the PE1 and acquire the MAC forwarding table information carried in an application specific type-length-value Application Specific TLV in a redundancy protection group application data message RG Application Data Message of the ICCP protocol; and the MAC forwarding entry generating unit 902 generates the MAC forwarding entry of the PE2 itself by using the MAC forwarding table information acquired by the Inter-Chassis Communications Protocol ICCP unit. The MAC forwarding table information receiving unit 901 may further include a user-defined control protocol unit, configured to receive a new user-defined control protocol message that is sent by the PE1 for synchronizing MAC forwarding table information between PE devices, and acquire MAC forwarding table information carried in the new user-defined control protocol message; and the MAC forwarding entry generating unit 902 generates the MAC forwarding entry of the PE2 by using the MAC forwarding table information acquired by the Inter-Chassis Communications Protocol ICCP unit or the user-defined control protocol unit. The method for synchronizing MAC forwarding table information between the PE2 and the PE1 in this embodiment is the same as the method that is for synchronizing MAC forwarding table information between the PE1 and the PE2 in the multihoming protection group in the VPLS fast rerouting method and is in the VPLS fast rerouting method provided in embodiment 1 of the present invention, and is not further described herein.

For example, if, when the PE2 receives data from the PW2, the designated forwarder has been switched to the PE2, the packet forwarding unit 903 directly forwards, by using a local forwarding entry generated according to the MAC forwarding table information synchronized from the PE1, data to the AC2 by unicast: For a qualified learning Qualified learning mode, the packet forwarding unit 903 performs forwarding to the AC2 that belongs to VLAN B of VPLS A, without broadcasting on all ACs that belong to VLAN B of VPLS A; and for an unqualified learning Unqualified learning mode, the packet forwarding unit 903 performs forwarding to the AC2 that belongs to VPLS A, without broadcasting on all ACs that belong to VPLS A. After synchronization of MAC forwarding table information between the PE1 and the PE2 is completed, because a MAC forwarding table of the PE2 includes a forwarding entry where a MAC address of the CE1 is associated with the AC2 and a forwarding entry where a MAC address of a customer device connected to the CE1 is associated with the AC2, the packet forwarding unit 903 directly forwards, to the AC2 by unicast according to a table lookup result of the MAC forwarding table, the data packet whose destination address is the MAC address of the CE1 or that of the customer device connected to the CE1.

For customer data traffic sent from the CE1 to the CE2, when the AC1, the PE1, or the PW1 fails, the designated forwarder is switched to the PE2 through synchronization of state information, and at this time, the CE1 sends a data packet to the PE2 by using the AC2. Though the PE2 has not learned remote MAC address information through a data plane at this time, by using a mechanism that is for synchronizing MAC forwarding table information between the PE1 and the PE2 provided in this embodiment and where the MAC forwarding table of the PE2 includes a forwarding entry that associates a MAC address of the remote CE2 and a MAC address of a customer device connected to the CE2 with the PW2, and the packet forwarding unit 903 in the PE2 directly forwards, to the PW2 by unicast according to the table lookup result of the MAC forwarding table, the data packet whose destination address is the MAC address of the CE2 and the data packet whose destination address is the MAC address of the customer device connected to the CE2, thereby avoiding unnecessary data broadcasting in a backbone network.

Further, the PE2 further includes a MAC forwarding table information sending unit, configured to synchronize, by the PE2, its MAC forwarding table information to the PE1 in the multihoming protection group after being switched to act as the designated forwarder, so that, when the PE2 fails, or PW2 fails, or the PE1 is switched again to act as the designated forwarder, the PE1 may forward a received data packet by using its forwarding entry generated according to the MAC forwarding table information.

Though this embodiment describes the VPLS fast rerouting device provided in embodiment 4 by taking an example where a VPLS multihoming protection group includes two PEs, the VPLS fast rerouting device provided in embodiment 4 of the present invention is also applicable to the case that the multihoming protection group includes multiple PEs, which is not further described herein.

When MAC forwarding table information sent by a designated forwarder PE in a multihoming protection group is received, the VPLS fast rerouting device provided in the embodiment of the present invention generates its MAC forwarding entry according to the MAC forwarding table information; and, when the designated forwarder or a designated forwarder pseudo wire in the multihoming protection group fails, or when the VPLS fast rerouting device is switched to act as the designated forwarder, the VPLS fast rerouting device receiving a data packet forwards the data packet by using its MAC forwarding entry, thereby avoiding broadcasting the data packet to all remote PEs that belong to a same VPLS instance and all local interfaces, and avoiding a possible service interruption, and further reducing a waste of bandwidth resources in a backbone network and processing resources of the PE.

According to description of the preceding implementation manners, a person of ordinary skill in the art may clearly understand that the embodiments of the present invention may be implemented through software plus a necessary universal hardware platform, and may certainly be implemented through hardware. Based on such an understanding, technical solutions in the embodiments of the present invention may find an expression in a form of a software product, and the computer software product may be stored in a storage medium, such as an ROM/RAM, a magnetic disk, or an optical disk, and include several instructions that enables a computer device, a server, or another network device to execute the methods described in the embodiments of the present invention or in some parts of the embodiments of the present invention.

The foregoing descriptions are merely exemplary embodiments of the present invention, but not intended to limit the protection scope of the present invention. Any modification, equivalent replacement, improvement, and so on made without departing from the spirit and principle of the present invention shall fall within the protection scope of the present invention.

What is claimed is:

1. A virtual private local area network service (VPLS) fast rerouting method, comprising:
    generating, by a remote provider edge (PE), a backup forwarding entry according to media access control (MAC) address information learned from a first pseudo wire,
        wherein the MAC address information in the backup forwarding entry is associated with pseudo wires among non-designated forwarder pseudo wires,
        a first PE acting as a designated forwarder in a multihoming protection group is connected to the remote PE through the first pseudo wire, and
        other PEs acting as non-designated forwarders in the multihoming protection group are connected to the remote PE through the non-designated forwarder pseudo wires; and
    when the first pseudo wire fails, the first PE fails, or one of the other PEs acting as non-designated forwarders is switched to act as the designated forwarder, forwarding, by the remote PE, a data packet by using the backup forwarding entry;
    wherein MAC forwarding table information between the first PE and the other PEs acting as non-designated forwarders are synchronized by:
        sending, the MAC forwarding table information on the first PE to the other PEs acting as non-designated forwarders, and
        generating, by the other PEs acting as non-designated forwarders which receive the MAC forwarding table information on the first PE, MAC forwarding entries of the other PEs acting as non-designated forwarders by replacing identifiers of pseudo wires or attachment circuits in the MAC forwarding table information with identifiers of non-designated forwarder pseudo wires or attachment circuits connected to the PEs acting as non-designated forwarders,
        wherein both the non-designated forwarder pseudo wires and attachment circuits connected to the other PEs acting as non-designated forwarders and the pseudo wires and attachment circuits in the MAC forwarding table information belong to the multihoming protection group.

2. The method according to claim 1, wherein the forwarding, by the remote PE, a data packet by using the backup forwarding entry comprises: when the first pseudo wire or the first PE fails, but the designated forwarder is not switched, forwarding, by the remote PE, the data packet to every pseudo wire among the non-designated forwarder pseudo wires by using the backup forwarding entry.

3. The method according to claim 1, wherein the forwarding, by the remote PE, a data packet by using the backup forwarding entry comprises: when one of the other PEs acting as non-designated forwarders is switched to act as the designated forwarder, forwarding, by the remote PE by using the backup forwarding entry, the data packet to a pseudo wire connecting the PE switched to act as the designated forwarder and the remote PE.

4. The method according to claim 1, wherein PEs that is in the multihoming protection group and receive the data packet forward, by using their MAC forwarding entries, the data packet to the remote PE or a customer edge (CE) accessing the multihoming protection group.

5. The method according to claim 4, wherein an application specific type-length-value (Application Specific TLV) in a redundancy protection group application data message (RG Application Data Message) of an Inter-Chassis Communications Protocol (ICCP) is used to carry the MAC forwarding table information to synchronize the MAC forwarding table information between the first PE and the other PEs acting as non-designated forwarders.

6. A virtual private local area network service (VPLS) fast rerouting device comprising:
    a processor;
    a non-transitory computer readable medium connected to the processor and having stored thereon instructions that, when executed, cause the processor to:
        acquire source media access control MAC address information from a data packet received through a first pseudo wire PW;
        acquire information about a multihoming protection group formed by a first PE acting as a designated forwarder and other PEs acting as non-designated forwarders, wherein the first PE and the other PEs are connected to the fast rerouting device;
        generate a backup forwarding entry according to the acquired source MAC address information and the acquired information about the multihoming protection group,
        wherein the source MAC address information in the backup forwarding entry is associated with pseudo wires among non-designated forwarder pseudo wires,
        the first PE in the multihoming protection group is connected to the fast rerouting device through the first pseudo wire, and
        the other PEs acting as non-designated forwarders are connected to the fast rerouting device through the non-designated forwarder pseudo wires; and
        forward the packet by using the backup forwarding entry when the first PW fails, the first PE fails, or the designated forwarder is switched;
    wherein MAC forwarding table information between the first PE and the other PEs acting as non-designated forwarders are synchronized by:
        sending the MAC forwarding table information on the first PE to the other PEs acting as non-designated forwarders, so that the other PEs acting as non-designated forwarders, which receive the MAC forwarding table information on the first PE, generate MAC forwarding entries of the other PEs acting as non-designated forwarders by replacing identifiers of pseudo wires or attachment circuits in the MAC forwarding table information with identifiers of non-designated forwarder pseudo wires or attachment circuits connected to the PEs acting as non-designated forwarders, wherein both the non-designated forwarder pseudo wires and attachment circuits connected to the other PEs acting as non-designated forwarders and the pseudo wires and attachment circuits in the MAC forwarding table information belong to the multihoming protection group.

7. The device according to claim 6, wherein the non-transitory computer readable medium further has instructions stored thereon that, when executed, cause the processor to forward the data packet to every pseudo wire in the non-designated forwarder pseudo wires by using the backup forwarding entry when the first pseudo wire or the first PE in the multihoming protection group fails, but the designated forwarder is not switched.

8. The device according to claim 6, wherein the non-transitory computer readable medium further has instructions stored thereon that, when executed, cause the processor to forward, when one of the other PEs acting as non-designated forwarders is switched to act as the designated forwarder, the data packet to a pseudo wire connecting the PE switched to act as the designated forwarder and the fast rerouting device by using the backup forwarding entry.

\* \* \* \* \*